US012801770B2

(12) United States Patent
Davidson et al.

(10) Patent No.: US 12,801,770 B2
(45) Date of Patent: Nov. 17, 2026

(54) MANAGING AIR GAPPED NETWORKS USING A SECRET TIME-BASED POLICY SYNCHRONIZATION REQUEST

(71) Applicant: Dell Products L.P., Round Rock, TX (US)

(72) Inventors: Michal Davidson, Beit Shemesh (IL); Amos Zamir, Beer-Sheva (IL); Shoham Levy, Pardes Hana-Karkur (IL)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/740,724

(22) Filed: Jun. 12, 2024

(65) Prior Publication Data

US 2025/0384150 A1 Dec. 18, 2025

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
USPC .......................................................... 726/27
See application file for complete search history.

(56) References Cited

U.S. PATENT DOCUMENTS 6,133,810 A * 10/2000 Shockley ................ H01P 1/205 333/225
2005/0154885 A1* 7/2005 Viscomi .............. G06F 21/6218 713/165
2006/0094450 A1* 5/2006 Park .................. H04W 52/0225 455/458
2014/0241337 A1* 8/2014 Marsh ................... H04W 56/00 370/350

(Continued)

FOREIGN PATENT DOCUMENTS

CN 109802649 A * 5/2019
CN 116432198 A * 7/2023 ........... G06F 21/602
JP 2013175071 A * 9/2013

OTHER PUBLICATIONS

Li, Jun, Sharad Singhal, Ram Swaminathan, and Alan H. Karp. "Managing data retention policies at scale." IEEE Transactions on Network and Service Management 9, No. 4 (2012): 393-406. (Year: 2012).*

(Continued)

*Primary Examiner* — Luu T Pham
*Assistant Examiner* — Walter J Malinowski
(74) *Attorney, Agent, or Firm* — Chamberlain, Hrdlicka, White, Williams & Aughtry; Aly Z. Dossa

(57) ABSTRACT

Techniques described herein relate to a method for performing policy synchronizations. The method includes identifying, by a storage manager, a policy retrieval synchronization generation event; in response to the identifying: identifying a maximum time interval and a minimum time interval;

(Continued)

generating open time intervals using a synchronization algorithm, a seed for the synchronization algorithm, a device start time, the maximum time interval, and the minimum time interval, wherein the seed and the device start time were generated during initialization prior to identifying the policy retrieval synchronization generation event; and performing policy synchronizations using the open time intervals by obtaining a policy from a control manager.

20 Claims, 6 Drawing Sheets

(56) References Cited

U.S. PATENT DOCUMENTS

2014/0241384 A1* 8/2014 Du .......................... H04L 7/043
370/515
2016/0217217 A1* 7/2016 Boudville ........... G06F 16/9554
2017/0093215 A1* 3/2017 Ng .......................... H02J 50/10
2017/0373660 A1* 12/2017 Sinha ................... H03H 7/0115
2018/0213002 A1* 7/2018 Figovsky ................ G06F 21/53
2020/0019430 A1* 1/2020 Trabelsi .............. G06F 9/45558
2020/0100283 A1* 3/2020 Naguib ................... G01S 11/06
2021/0325855 A1* 10/2021 Wouhaybi .......... G05B 19/4155
2022/0012134 A1* 1/2022 Chatterjee ........... H04L 67/1097
2022/0191204 A1* 6/2022 Hasek ................... H04L 63/164
2023/0125676 A1* 4/2023 Rashidian ............ H01Q 1/2283
342/372
2023/0147632 A1* 5/2023 Pabouctsidis ...... H04B 10/1143
398/118
2023/0234538 A1* 7/2023 Golsch .................. B60W 10/08
340/5.61
2023/0361464 A1* 11/2023 Litjes ..................... H04B 7/088
2023/0396456 A1* 12/2023 Anderson ............. H04L 9/3255
2024/0003757 A1* 1/2024 Wunderlich ......... G01K 11/265
2024/0007461 A1* 1/2024 Reed ....................... G06F 21/40
2025/0141926 A1* 5/2025 Jain ....................... H04L 63/105

OTHER PUBLICATIONS

Eloraby, Ahmed, Said Soliman, Amr Adbullah, Amr El-Kadi, Lamya Ba Brahem, Aya Samir, Nouran Hassan, and Rawan Elrayes. "Distributed Multimedia Systems: A Macro Perspective." IEEE Access (2025). (Year: 2026).*
Joshi, James BD, Zhaohui Kevin Li, Husni Fahmi, Basit Shafiq, and Arif Ghafoor. "A model for secure multimedia document database system in a distributed environment." IEEE Transactions on Multimedia 4, No. 2 (2002): 215-234. (Year: 2002).*

* cited by examiner

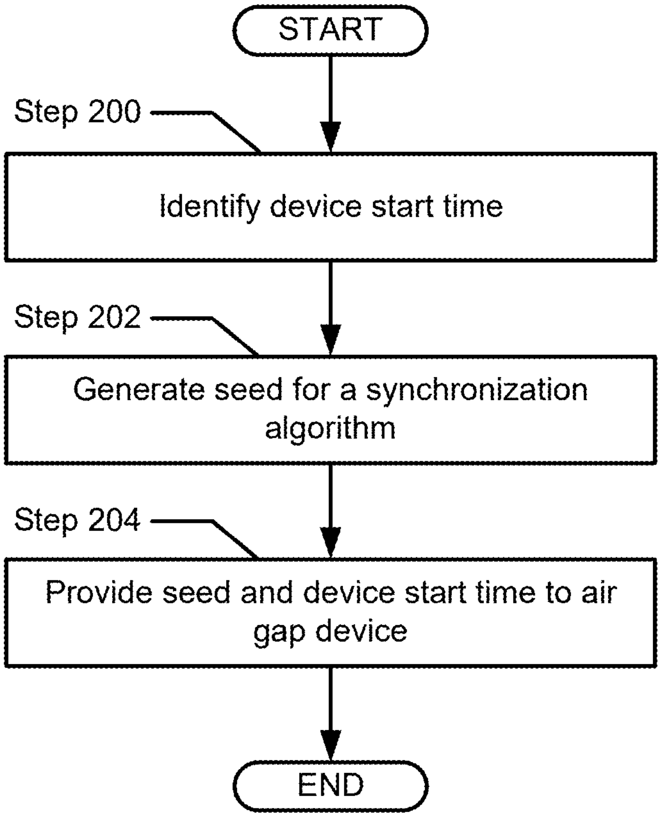
FIG. 2.1

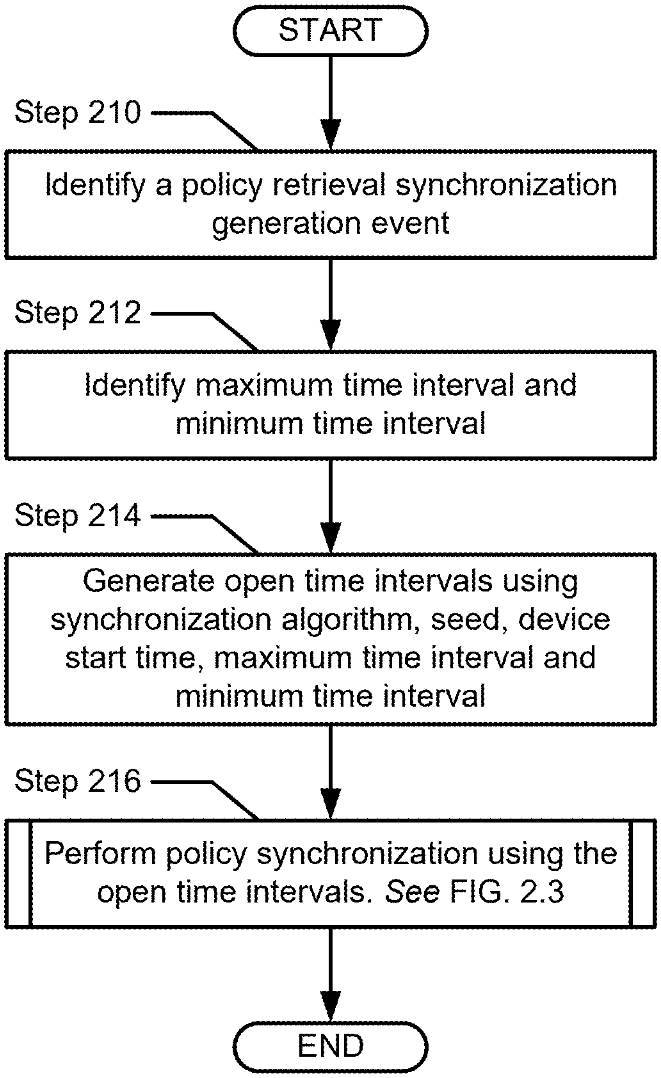
FIG. 2.2

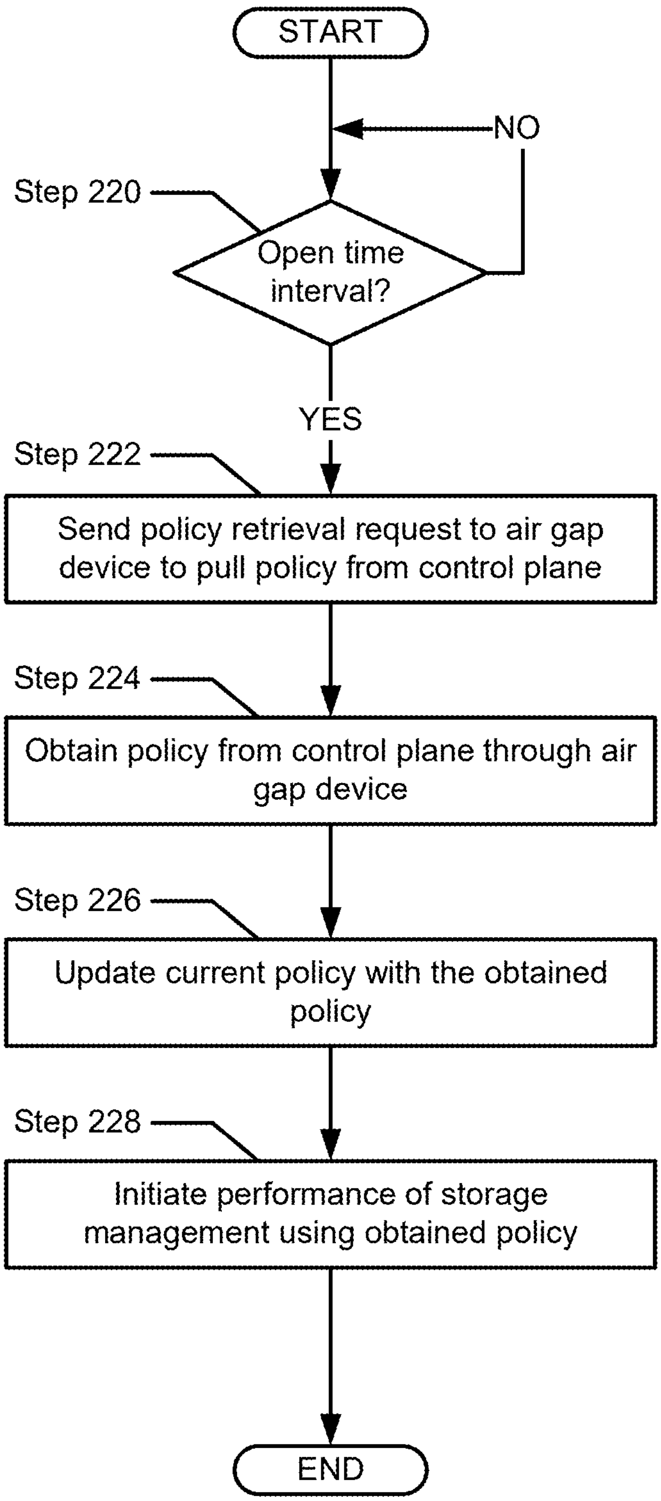
FIG. 2.3

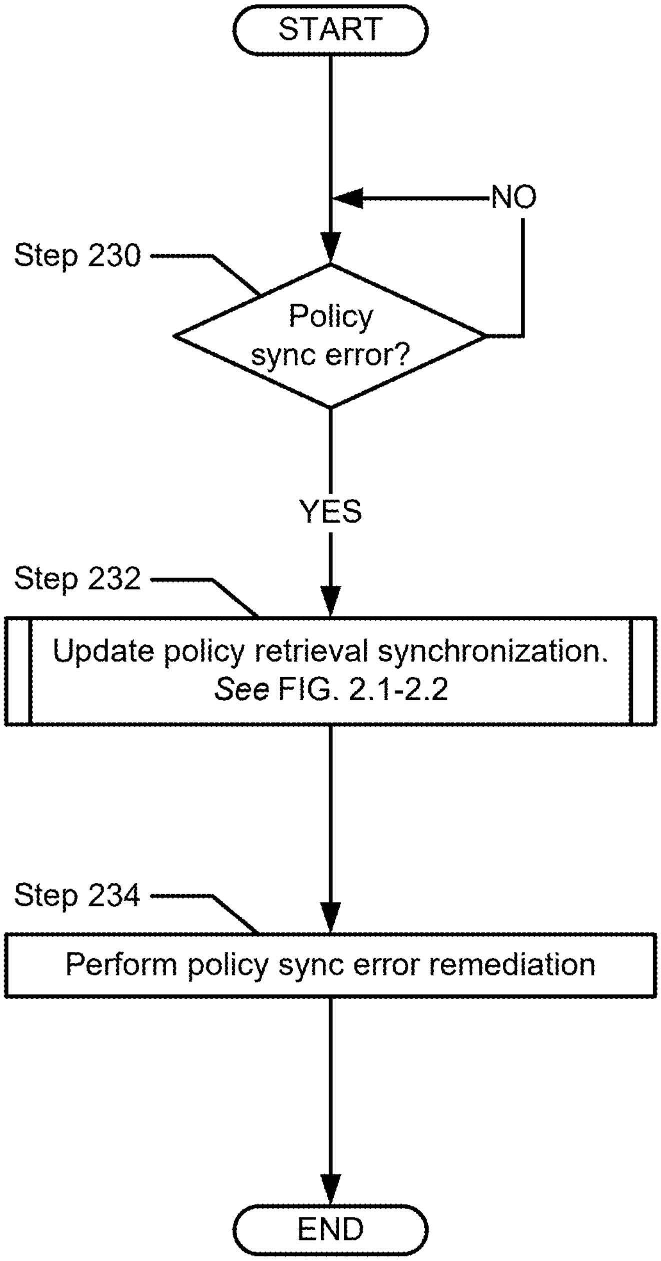
FIG. 2.4

MANAGING AIR GAPPED NETWORKS USING A SECRET TIME-BASED POLICY SYNCHRONIZATION REQUEST

BACKGROUND

Computing devices may provide services for users. To provide the services, the computing devices may store data on other computing devices. To store data on other computing devices, the computing devices may communicate with the other computing devices through a network. The data may be important to users such that the users may generate policies specifying rules and requirements to protect the data. The users may secure the network to prevent unwanted access of the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method for initializing the generation of open time intervals in accordance with one or more embodiments disclosed herein.

FIG. 2.2 shows a flowchart of a method for generating open time intervals in accordance with one or more embodiments disclosed herein.

FIG. 2.3 shows a flowchart of a method for performing policy synchronization in accordance with one or more embodiments disclosed herein.

FIG. 2.4 shows a flowchart of a method for managing policy synchronization errors in accordance with one or more embodiments disclosed herein.

DETAILED DESCRIPTION

Figure 1:
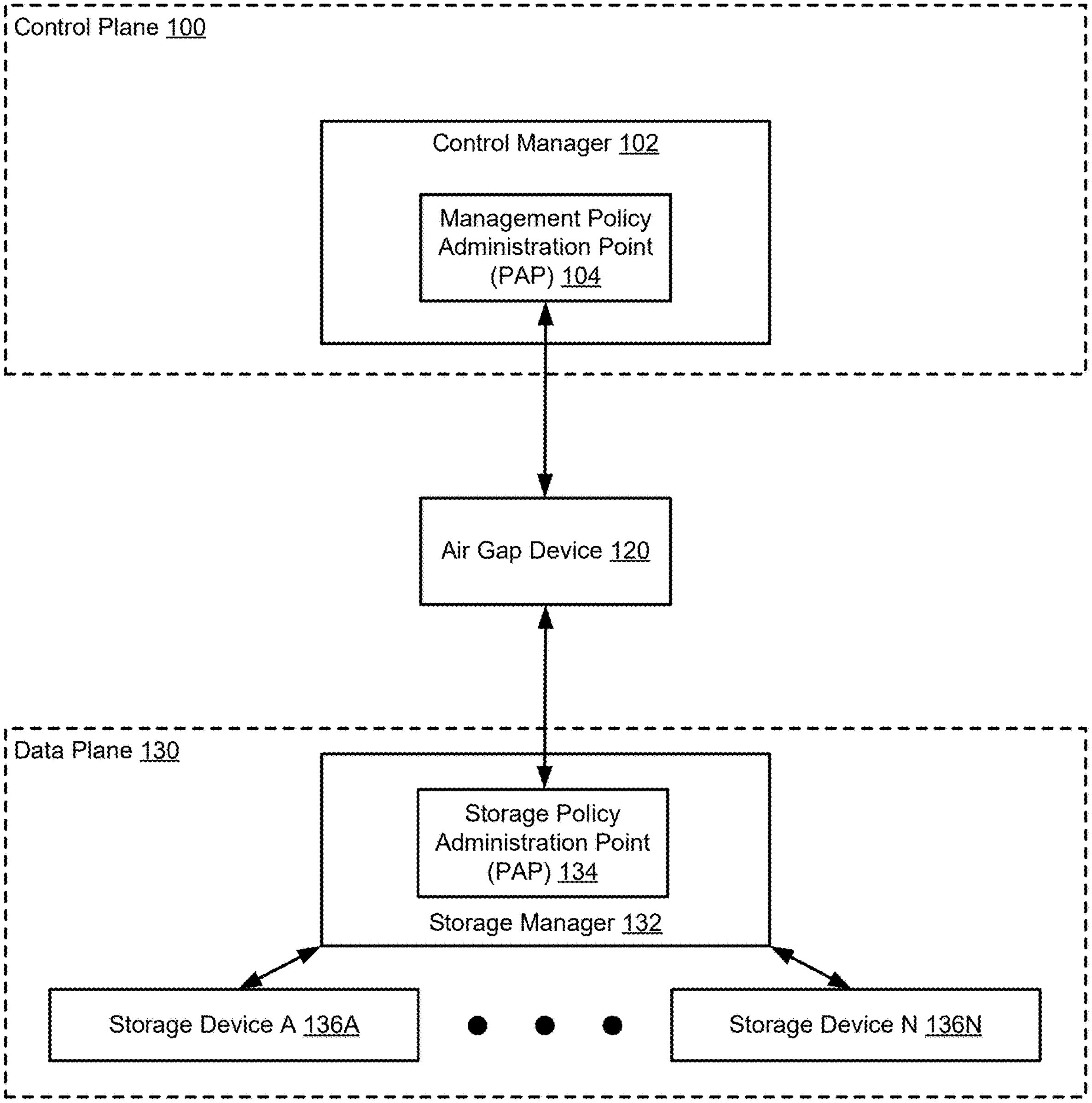
FIG. 1 shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for performing policy synchronizations for storage systems using open time intervals.

Existing approaches for protecting communications over air-gapped networks for implementing policy synchronization between storage system and a manager rely on fixed time periods. Existing technologies do not support enforcing expected communications during the time period and interval calculated by both authenticated sides according to a shared secret. Accordingly, the network may be susceptible to attacks that may result in nefarious users or entities obtaining and modifying policies associated with, or data stored on, storage systems.

To address, at least in part, the aforementioned issues discussed above, embodiments disclosed herein enable enforcement of storage system policies for storage systems that do not support a bi-directional control path connection between the storage systems and a Policy Administration Point (PAP). Embodiments disclosed herein are based on asynchronous implementation but invoke a policy synchronization request at a random time. The random time (i.e., the open time interval) is generated based on a shared secret that synchronizes the sync time when the PAP opens and is listening to policy synchronization requests. Both an air gap device and storage manager of the storage system predict the next open window using the shared secret (i.e., a seed) and a device time.

As a result, embodiments disclosed herein improve the protection of communication over air-gapped networks according to a pseudo-random period known only to control plane and valid devices according to a shared secret. Embodiments disclosed herein may enable communication from a control plane to valid devices at time periods which are unknown to third parties. The pseudo-randomness of the time calculation will cause attempts to detect an access pattern to be challenging for malicious third parties. Furthermore, embodiments disclosed herein may also enable flagging and blocking attempts to connect at non-valid time periods by malicious third parties.

While embodiments disclosed herein are discussed in relation to policy synchronization, one of ordinary skill in the relevant art will appreciate that the embodiments disclosed herein may be applied to any scenario in which data may be pulled from one device by another device through an air-gapped network without departing from embodiments disclosed herein. For example, the embodiments disclosed herein may be used to generate open time intervals for performing synchronizations of backups between devices through an air-gapped network.

FIG. 1 shows a diagram a system in accordance with one or more embodiments disclosed herein. The system may include a control plane (100), an air gap device (120), and a data plane (130). The control plane (100) may include a control manager (102). The data plane (130) may include a storage manager (132) and storage devices (e.g., 136A, 136N). The components of the system illustrated in FIG. 1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1 is discussed below.

In one or more embodiments, the control plane (100) is configured to include the functionality to perform management services for the data plane (130). As such, the control plane (100) may configure and manage storage devices (e.g., 136A, 136N), manage the storage of data on the storage devices (e.g., 136A, 136N), implement security models, generate or update policies associated with the storage devices (e.g., 136A, 136N), etc. The control plane (100) may include other and/or additional functionalities without departing from embodiments disclosed herein. In one or more embodiments, to perform the aforementioned functionalities, the control plane may include a control manager (102). The control plane (100) may include other and/or additional components without departing from embodiments disclosed herein.

In one or more embodiments, the control manager (102) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the control manager (102) described herein and/or all, or a portion, of the methods illustrated in FIGS. 2.1-2.4. The control manager (102) may be implemented using other types of computing devices without departing from the embodiments disclosed herein. For additional details regarding computing devices, refer to FIG. 3.

The control manager (102) may be implemented using logical devices without departing from the embodiments disclosed herein. For example, the control manager (102) may include virtual machines that utilize computing resources of any number of physical computing devices to provide the functionality of the control manager (102). The control manager (102) may be implemented using other types of logical devices without departing from the embodiments disclosed herein.

In one or more embodiments, the control manager (102) may include the functionality to, or otherwise be programmed or configured to, perform the management services of the control plane (100). As discussed above, the management services may include configuring and managing storage devices (e.g., 136A, 136N), managing the storage of data on the storage devices (e.g., 136A, 136N), implementing security models, generating or updating policies associated with the storage devices (e.g., 136A, 136N), etc. The control manager (102) may include other and/or additional functions without departing from embodiments disclosed herein.

As discussed above, the control manager (102) may include the functionality to perform the management services of the control plane (100). To perform the aforementioned services, the control manager (102) may include a management policy administration point (PAP) (104). The control manager (102) may include other, fewer, or additional components without departing from embodiments disclosed herein.

In one or more embodiments, the management PAP (104) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the management PAP (104) described throughout this Detailed Description.

In one or more embodiments disclosed herein, the management PAP (104) may be implemented as computer instructions, e.g., computer code, stored on a storage that when executed by a processor of the control manager (102) causes the control manager (102) to provide the functionality of the management PAP (104) described throughout this Detailed Description.

In one or more embodiments, the management PAP (104) may be configured to include the functionality to perform policy management services. The policy management services may include generating policies, storing policies (e.g., in a storage of the control manager (102) (not shown)), maintaining policies, updating polices, and providing policies to the data plane (130) (e.g., a storage PAP (134)) when requested during policy synchronization such that the data plane may implement the rules and/or requirements included in the current policies. The management PAP (104) may generate or update policies based on user instructions (e.g., a system administrator may provide a rule to include in a policy). The management PAP (104) may include other and/or additional functionalities without departing from embodiments disclosed herein.

As used herein, a policy may refer to one or more data structures that include requirements or rules for managing the storage devices (e.g., 136A, 136N). A policy may include any type and/or quantity of requirements or rules for managing the storage devices (e.g., 136A, 136N) without departing from embodiments disclosed herein. For example, the policy may include retention periods for data stored on the storage devices (e.g., 136A, 136N), encryption methods used when performing communications in the data plane (130), encryption keys, digital certificates, types of data storage functions (e.g., replication, deduplication, compression, etc.) to perform on data stored in the storage devices (e.g., 136A, 136N), which storage devices (e.g., 136A, 136N) may store certain types of data, user access restrictions for the data stored on the storage devices (e.g., 136A, 136N), etc. The management PAP (104) may generate or update policies based on user instructions (e.g., a system administrator may provide a rule to include in a policy). Alternatively, the management PAP (104) may obtain policies generated by users (e.g., system administrators) or other management entities not shown in FIG. 1. A policy may be provided to and used by a storage manager (132) to manage the storage devices (e.g., 136A, 136N) according to the rules or requirements specified by the policy. A user may desire to change rules and/or requirements associated with a policy so new policies may be generated or old policies may be updated. Accordingly, new and/or updated policies may be distributed throughout the system. A policy may include other and/or additional information and may be used for other and/or additional purposes without departing from embodiments disclosed herein.

Returning to the discussion of the system of FIG. 1, in one or more embodiments, the air gap device (120) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the air gap device (120) described herein and/or all, or a portion, of the methods illustrated in FIGS. 2.1-2.4. The air gap device (120) may be implemented using other types of computing devices without departing from the embodiments disclosed herein. For additional details regarding computing devices, refer to FIG. 3.

The air gap device (120) may be implemented using logical devices without departing from the embodiments disclosed herein. For example, the air gap device (120) may include virtual machines that utilize computing resources of any number of physical computing devices to provide the functionality of the air gap device (120). The air gap device (120) may be implemented using other types of logical devices without departing from the embodiments disclosed herein.

In one or more embodiments, the air gap device (120) may include the functionality to, or otherwise be programmed or configured to, perform network security services. The network security services may include opening and closing the network connection between the storage manager (132) and the control manager (102) based on pseudo-random open time intervals generated using a shared secret with the storage manager (132) via the methods discussed in FIGS. 2.1-2.2. The air gap device (120) may close the network connection by physically or virtually removing the storage manager (132) and/or the control manager (102) from the network. The air gap device (120) may include other and/or additional functionalities without departing from embodiments disclosed herein.

In one or more embodiments, the data plane (130) may be configured to include the functionality to store and communicate data according to the direction of the control plane (100). The data plane (130) may include other and/or additional functionalities without departing from embodiments disclosed herein. To perform the aforementioned functionality, the data plane (130) may include a storage manager (132) and one or more storage devices (e.g., 136A, 136N). The data plane (130) may include other, additional, or fewer components without departing from embodiments disclosed herein. Each of the aforementioned components is discussed below.

In one or more embodiments, the storage manager (132) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the storage manager (132) described herein and/or all, or a portion, of the methods illustrated in FIGS. 2.1-2.4. The storage manager (132) may be implemented using other types of computing devices without departing from the embodiments disclosed herein. For additional details regarding computing devices, refer to FIG. 3.

The storage manager (132) may be implemented using logical devices without departing from the embodiments disclosed herein. For example, the storage manager (132) may include virtual machines that utilize computing resources of any number of physical computing devices to provide the functionality of the storage manager (132). The storage manager (132) may be implemented using other types of logical devices without departing from the embodiments disclosed herein.

In one or more embodiments, the storage manager (132) may be configured to include the functionality to perform storage management services. The storage management services may include managing the storage of data in the storage devices (e.g., 136A, 136N) in accordance with obtained policies by implementing the rules and requirements specified by the policies. The storage manager (132) may include other and/or additional functionalities without departing from embodiments disclosed herein.

To perform the aforementioned functionality, the storage manager (132) may include a storage policy administration point (PAP) (134). The storage PAP (134) may include the functionality to generate open time intervals as discussed in the methods of FIG. 2.1, perform policy synchronizations based on the open time intervals as discussed in the methods of FIG. 2.2, and monitor for policy synchronization errors as discussed in FIG. 2.3. The storage PAP (134) may include other and/or additional functionalities without departing from embodiments disclosed herein.

In one or more embodiments, the storage policy administration point (PAP) (134) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the storage PAP (134) described throughout this Detailed Description.

In one or more embodiments disclosed herein, the storage PAP (134) may be implemented as computer instructions, e.g., computer code, stored on a storage that when executed by a processor of the storage manager (134) causes the storage manager (132) to provide the functionality of the storage PAP (134) described throughout this Detailed Description.

In one or more embodiments, as discussed above, the data plane (130) may include one or more storage devices (e.g., 136A, 136N). The data plane (130) may include any quantity of storage devices without departing from embodiments disclosed herein. In one or more embodiments, a storage device of the storage devices (e.g., 136A, 136N) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the storage devices (e.g., 136A, 136N)

described herein and/or all, or a portion, of the methods illustrated in FIGS. 2.1-2.4. The storage devices (e.g., 136A, 136N) may be implemented using other types of computing devices without departing from the embodiments disclosed herein. For additional details regarding computing devices, refer to FIG. 3.

The storage devices (e.g., 136A, 136N) may be implemented using logical devices without departing from the embodiments disclosed herein. For example, the storage devices (e.g., 136A, 136N) may include virtual machines that utilize computing resources of any number of physical computing devices to provide the functionality of the storage devices (e.g., 136A, 136N). The storage devices (e.g., 136A, 136N) may be implemented using other types of logical devices without departing from the embodiments disclosed herein.

In one or more embodiments, the storage devices (e.g., 136A, 136N) may be configured to include the functionality to store and provide data. The storage devices (e.g., 136A, 136N) may store and provide data based on rules and requirements of one or more policies as managed by the storage manager (132). Accordingly, the storage devices (e.g., 136A, 136N) may obtain, store, modify, delete, process, and/or transmit data based on the rules and requirements of the policies. The storage devices (e.g., 136A, 136N) may include other and/or additional functionalities without departing from embodiments disclosed herein.

In one or more embodiments, as discussed above, the components of the system of FIG. 1 may be operatively connected via a network (not shown). The network may be implemented using may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) because the computing device to perform the functions of the network described herein and/or all, or a portion, of the methods illustrated in FIGS. 2.1-2.4. The network may be implemented using other types of computing devices without departing from the embodiments disclosed herein. For additional details regarding computing devices, refer to FIG. 3.

The network may be implemented using logical devices without departing from the embodiments disclosed herein. For example, the network may include virtual machines that utilize computing resources of any number of physical computing devices to provide the functionality of the network. The network may be implemented using other types of logical devices without departing from the embodiments disclosed herein.

In one or more embodiments, the network may represent a (decentralized or distributed) computing network and/or fabric configured for computing resource and/or messages exchange among registered computing devices (e.g., the control manager (102), air gap device (120), the storage manager (132), and the storage devices (e.g., 136A, 136N)). As discussed above, components of the system may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages.

In one or more embodiments, the network may be implemented using any combination of wired and/or wireless network topologies, and the network may be operably connected to the Internet or other networks. Further, the network may enable interactions between, for example, the control manager (102), air gap device (120), the storage manager (132), the storage devices (e.g., 136A, 136N), and/or other entities not shown in FIG. 1 through any number and type of wired and/or wireless network protocols (e.g., TCP, UDP, IPv4, etc.).

The network may encompass various interconnected, network-enabled subcomponents (not shown) (e.g., switches, routers, gateways, cables etc.) that may facilitate communications between the components of the system. In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network and its subcomponents may be implemented using hardware, software, or any combination thereof.

In one or more embodiments, before communicating data over the network, the data may first be broken into smaller batches (e.g., data packets) so that larger size data can be communicated efficiently. For this reason, the network-enabled subcomponents may break data into data packets. The network-enabled subcomponents may then route each data packet in the network to distribute network traffic uniformly.

In one or more embodiments, the network-enabled subcomponents may decide how real-time (e.g., on the order of milliseconds or less) network traffic and non-real-time network traffic should be managed in the network. In one or more embodiments, the real-time network traffic may be high-priority (e.g., urgent, immediate, etc.) network traffic. For this reason, data packets of the real-time network traffic may need to be prioritized in the network. The real-time network traffic may include data packets related to, for example (but not limited to): videoconferencing, web browsing, voice over Internet Protocol (VoIP), etc.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

Although the system of FIG. 1 is shown as having a certain number of components (e.g., 100, 102, 104, 120, 130, 132, 134, 136A, 136N), in other embodiments disclosed herein, the system may have more or fewer components. For example, the functionality of each component described above may be split across components or combined into a single component. Further still, each component may be utilized multiple times to carry out an iterative operation.

FIG. 2.1 shows a flowchart of a method for initializing the generation of open time intervals in accordance with one or more embodiments disclosed herein. The method shown in FIG. 2.1 may be performed by, for example, a storage manager (e.g., 132, FIG. 1). Other components of the system in FIG. 1 may perform all, or a portion, of the method of FIG. 2.1 without departing from the scope of the embodiments described herein. While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a device start time is identified. In one or more embodiments, the storage manager may include a clock (e.g., a real-time clock) that keeps track of the time of data and provides this information to the storage manager. The storage manager may identify the current time as of the performance of Step 202 as the device start time. The storage manager may identify the current start plus or minus a user configurable buffer period (e.g., 30 seconds) as the device start time. The storage manager may identify any time as the device start time without departing from embodiments disclosed herein. The device start time may set the reference start point for the generated open time intervals. The device start time may be input into the synchronization algorithm to generate the open time intervals. The device start time may be identified via other and/or additional methods without departing from embodiments disclosed herein.

In Step 202, a seed for a synchronization algorithm is generated. In one or more embodiments, the storage manager may generate a seed. As used herein, a seed may refer to a sequence of one or more numbers, values, and/or parameters that may be used to initialize or configure the synchronization algorithm. For example, the seed may be a sequence of set and unset bits, numbers, or a parameters that may be input into the synchronization algorithm that initialize the synchronization algorithm to a particular configuration to generate each open time interval. As such multiple devices executing instances of the synchronization algorithm may generate the same open time intervals by initializing the synchronization algorithm using the seed. In one embodiment, the seed may be obtained from a user (e.g., a system administrator). In an alternative embodiment, the seed may be generated by the storage manager using any appropriate type of random number generator without departing from embodiments disclosed herein. A seed the synchronization algorithm may be generated via other and/or additional methods without departing from embodiments disclosed herein.

In Step 204, the seed and device start time is provided to the air gap device. In one or more embodiments, the storage manager may provide the seed and the device start time to the air gap device. As a result, the air gap device may generate the same open time intervals by also performing the methods of Steps 208-210. The seed and the device start time may be provided to the air gap device using any appropriate technique for data transmission without departing from embodiments disclosed herein. For example, the seed and device start time may be transmitted as one or more messages including one or more network packets through one or more network devices that operatively connect the storage manager to the air gap device. The seed and device start time may be provided to the air gap device via other and/or additional methods without departing from embodiments disclosed herein.

In one or more embodiments disclosed herein, the method ends following Step 204. The method shown in FIG. 2.1 may be performed once to generate a seed and a device start time. However, the seed and device start time may be updated periodically. Frequent updates of the seed and device start time may not be recommended because updating and sending the seed and device start time may expose the seed and device start time (even if encrypted) through the communication channel to nefarious entities. The seed and device start time may include sensitive information that may even be generated and/or passed by a system administrator manually or by an encrypted blob.

FIG. 2.2 shows a flowchart of a method for generating open time intervals in accordance with one or more embodiments disclosed herein. The method shown in FIG. 2.2 may be performed by, for example, a storage manager (e.g., 132, FIG. 1). Other components of the system in FIG. 1 may perform all, or a portion, of the method of FIG. 2.2 without departing from the scope of the embodiments described herein. While FIG. 2.2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 210, a policy retrieval synchronization generation event is identified. In one or more embodiments, the storage manager may identify a policy retrieval synchronization generation event. In one embodiment, the policy retrieval synchronization generation event may include obtaining a request to generate new time intervals from a user (e.g., a system administrator). In an alternative embodiment, the policy retrieval synchronization generation event may include identifying a point in time specified by an open time interval generation schedule. The open time interval generation schedule may be one or more data structures that specify points in time (e.g., second, minute, hour, day, month, year, etc.) to generate new open time intervals for policy synchronization. In yet another alternative embodiment, the policy retrieval synchronization generation event may include identifying a policy synchronization error as discussed in FIG. 2.3. In yet still another embodiment, the policy retrieval synchronization generation event may include the occurrence of a last generated open time interval of the current open time intervals. The policy retrieval synchronization generation event may be identified via other and/or additional methods without departing from embodiments disclosed herein.

In Step 212, a maximum time interval and minimum time interval are identified. In one or more embodiments, the storage manager may include or be operatively connected to storage that includes the maximum time interval and the minimum time interval. The storage manager may parse the storage to identify the maximum time interval and the minimum time interval. The maximum time interval and the minimum time interval may be identified via other and/or additional methods without departing from embodiments disclosed herein.

In one or more embodiments, as used herein, a maximum time interval specifies the maximum allowable time that a generated open time interval may include. In one or more embodiments, as used herein, a minimum time interval specifies the minimum allowable time that a generated open time interval may include. Accordingly, an open time interval of the generated open time intervals may include any time between the minimum time interval and the maximum time interval, including the minimum time interval and the maximum time interval. The minimum time interval and the maximum time interval may be configured by a user (e.g., a system administrator). Smaller maximum time intervals and bigger maximum time interval decrease the entropy of the solution. However, increasing the maximum time interval and decreasing the minimum time interval will increase the amount of time outdated policies can be used and may result in greater exposure of the system to eavesdroppers and nefarious actors. Users (e.g., a system administrator) may set the minimum time interval and the maximum time interval according to their organization's policy and risk strategy.

In Step 214, open time intervals are generated using a synchronization algorithm, the seed, the device start time, the maximum time interval, and the minimum time interval. In one or more embodiments, the storage manager may input the seed, the device start time, the maximum time interval, and the minimum time interval into the synchronization algorithm. The synchronization algorithm may then generate one or more open time intervals. The open time intervals may specify intervals of time starting from the device start time in which the air gap device may open the network connection and enable the storage manager to obtain a policy from the control manager. The air gap device may close the network connection at all times not included in the open time intervals. Each open time interval may be a function of the previous open time interval (or the device start time for the first open time interval), the seed value for that time interval, the maximum time interval, and the minimum time interval. The synchronization algorithm may include any appropriate type of cryptographically secure pseudorandom number generator (CSPRNG) or cryptographic pseudorandom number generator (CPRNG) algorithm without departing from embodiments disclosed herein. For example, the synchronization algorithm may include the Blum Blum Shub algorithm. The open time intervals may be generated using the synchronization algorithm, the seed, the device start time, the maximum time interval, and the minimum time interval via other and/or additional methods without departing from embodiments disclosed herein.

In one or more embodiments, the synchronization algorithm may generate open time intervals as follows. The CSPRNG algorithm may generate a sequence of numbers after being initialized using the seed. The sequence of numbers, T, may include t, t+1, t+2, . . . , tn. The sequence, T, may be used to generate open time intervals. Given the maximum time interval, the minimum time interval, the device start time (which is defined as t−1) and the air gap device is set to a close state, the next generated t (i.e., the next open time interval) may be given as: (i) t+1=t, (ii) while [t, t+1]<minimum time interval: (a) generate next x (i.e., x is a number specifying a period of time from t for which the corresponding open time interval lasts), (b) t =t+x is generated as the open time interval, (c) continue again for the next open time interval, and (iii) if [t, t+1]>the maximum time interval, then return [t, t+maximum time interval] as the open time interval. Other and/or additional algorithms and/or parameters may be used to generate the open time intervals without departing from embodiments disclosed herein. For example, the algorithm may include a maximum closed time interval and a minimum closed time interval associated with the closed time intervals.

In Step 216, policy synchronization is performed using the open time intervals. In one or more embodiments, the storage manager may perform policy synchronization using open time intervals via the methods discussed in FIG. 2.3. For additional information regarding performing policy synchronization using open time intervals, refer to FIG. 2.3.

In one or more embodiments disclosed herein, the method ends following Step 216.

FIG. 2.3 shows a flowchart of a method for performing policy synchronization in accordance with one or more embodiments disclosed herein. The method shown in FIG. 2.3 may be performed by, for example, a storage manager (e.g., 132, FIG. 1). Other components of the system in FIG. 1 may perform all, or a portion, of the method of FIG. 2.3 without departing from the scope of the embodiments described herein. While FIG. 2.3 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 220, a determination is made as to whether an open time interval has occurred. As discussed above, the storage manager may generate open time intervals specifying one or more intervals of time in which the air gap device may open the network connection and enable the storage manager to obtain a policy from the control manager. The storage manager may compare the current time (e.g., obtained from a real-time clock of the storage manager) with the next open time interval that has not yet occurred. In one or more embodiments disclosed herein, if the current time falls within the next open time interval, then the storage manager may determine that an open time interval has occurred. In one or more embodiments disclosed herein, if the current time does not falls within the next open time interval, then the storage manager may determine that an open time interval has not occurred. The determination as whether an open time interval has occurred may be made via other and/or additional methods without departing from embodiments disclosed herein.

In one or more embodiments disclosed herein, if it is determined that an open time interval has occurred, then the method proceeds to Step 222. In one or more embodiments disclosed herein, if it is determined that an open time interval has not yet occurred, then the method repeats Step 220.

In Step 222, a policy retrieval request is sent to the air gap device to pull a policy from the control plane. In one or more embodiments, the storage manager may send a policy retrieval request to the air gap device to pull a policy from the control plane during the open time interval. In response to obtaining the request, the air gap device may forward the request to the control plane (e.g., the control manager). The policy retrieval request may be transmitted using any appropriate technique for data transmission without departing from embodiments disclosed herein. For example, the policy retrieval request may be transmitted as a message including one or more network packets through one or more network devices that operatively connect the storage manager, the air gap device, and the control manager of the control plane. The policy retrieval request may be sent to the air gap device to pull a policy from the control plane via other and/or additional methods without departing from embodiments disclosed herein.

In Step 224, a policy is obtained from the control plane through the air gap device. In one or more embodiments, in response to obtaining the policy retrieval request, the control manager of the control plane may generate or otherwise obtain an updated policy and send the policy to the air gap device. The air gap device may then forward the policy to the storage manager. The policy may be transmitted using any appropriate technique for data transmission without departing from embodiments disclosed herein. For example, the policy may be transmitted as one or more messages including one or more network packets through one or more network devices that operatively connect the storage manager, the air gap device, and the control manager of the control plane. The policy may be obtained from the control plane through the air gap device via other and/or additional methods without departing from embodiments disclosed herein.

In Step 226, the current policy is updated with the obtained policy. In one or more embodiments, the storage manager updates the current policy with the obtained policy. The storage manager may, for example, tag the obtained policy as the new current policy. The storage manager may also delete the old policy. The current policy may be updated with the obtained policy via other and/or additional methods without departing from embodiments disclosed herein.

In Step 238, the performance of storage management using the obtained policy is initiated. In one or more embodiments, the storage manager may begin implementing the rules and requirements of the obtained policy instead of those of the old policy when managing the storage devices of the data plane. Accordingly, the storage management may send requests or instructions to the storage devices to perform the rules and requirements specified by the obtained policy. The performance of the storage management services using the obtained policy may be initiated via other and/or additional methods without departing from embodiments disclosed herein.

In one or more embodiments disclosed herein, the method ends following Step 228.

FIG. 2.4 shows a flowchart of a method for managing policy synchronization errors in accordance with one or more embodiments disclosed herein. The method shown in FIG. 2.4 may be performed by, for example, a storage manager (e.g., 132, FIG. 1). Other components of the system in FIG. 1 may perform all, or a portion, of the method of FIG. 2.4 without departing from the scope of the embodiments described herein. While FIG. 2.4 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 230, a determination is made as to whether a policy synchronization error has occurred. In one or more embodiments, the storage manager may monitor the policy synchronizations and check to determine whether a policy synchronization error has occurred. A policy synchronization error may include any unexpected event that may occur during policy synchronization without departing from embodiments disclosed herein. A policy synchronization error may include, for example, identifying out of sync open time intervals between the storage manager and the air gap device, identifying an unexpected network communication during a closed time interval (i.e., a non-open time interval), determining that a policy retrieval request was blocked, determining that there are no more current open time intervals, determining that the current policy has expired based on a user configurable expiration timestamp associated with the current policy, or any other unexpected event associated with policy synchronization without departing from embodiments disclosed herein. In one or more embodiments disclosed herein, if the storage manager identifies an unexpected event, then the storage manager may determine that a policy synchronization error has occurred. In one or more embodiments disclosed herein, if the storage manager does not identify an unexpected event, then the storage manager may determine that a policy synchronization error has not occurred. The determination as to whether a policy synchronization error has occurred may be made via other and/or additional methods without departing from embodiments disclosed herein.

In one or more embodiments disclosed herein, if it is determined that a policy synchronization error has occurred, then the method proceeds to Step 232. In one or more embodiments disclosed herein, if it is determined that a policy synchronization error has not occurred, then the method repeats Step 230.

In Step 232, the policy retrieval synchronization is updated. In one or more embodiments, the storage manager may generate new open time intervals to update the policy retrieval synchronization. The new open time intervals may be generated via the methods discussed in FIG. 2.2. For additional information regarding generating open time intervals, refer to FIG. 2.2. If a new seed and device start time are required, the new seed and device start time may be generated via the methods discussed in FIG. 2.1. For additional information regarding generating a new seed and device start time, refer to FIG. 2.1. The policy retrieval synchronization may be updated via other and/or additional methods without departing from embodiments disclosed herein.

In Step 234, policy synchronization error remediation is performed. In one or more embodiments, the storage manager may include (e.g., in storage) remediation steps. The remediation steps may include one or more data structures that include policy synch errors and corresponding actions to perform for each error to mitigate the damage associated with the error or to remediate the error. The actions may include, for example, do nothing, notify a user (e.g., system administrator), permanently close the network connection, block all communications to the storage devices, quarantine storage devices associated with the storage manager, etc. The actions may include any type of actions without departing from embodiments disclosed herein. Accordingly, the storage manager may compare the policy synchronization error identified in Step 230 and perform the one or more corresponding actions as specified by the remediation steps. The policy synchronization error remediation may be performed via other and/or additional methods without departing from embodiments disclosed herein.

Figure 3:
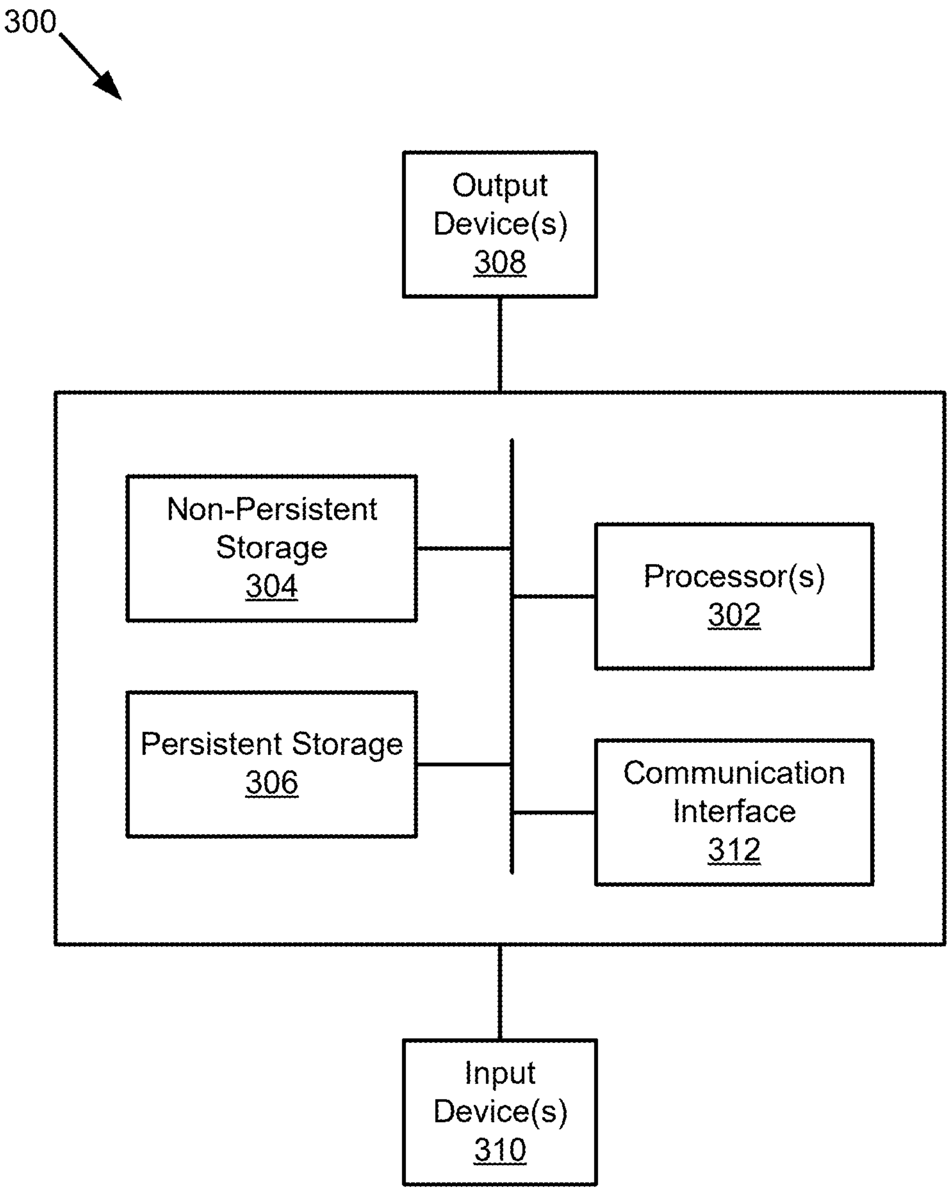
FIG. 3 shows a diagram of a computing device in accordance with one or more embodiments disclosed herein.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

As used herein, an identifier associated with an entity may refer to a unique combination of alphanumeric characters that may be used to specify the entity from other entities of the same type. The identifier may include any combination of alphanumeric characters without departing from embodiments disclosed herein. The identifier may be global (known to all components of the system) or local (e.g., component specific such as a file identifier local to a computing device that is not known to other computing devices) without departing from embodiments disclosed herein.

While the data structures data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while discussed as being stored in a storage, any of the aforementioned data structures may be stored in different locations (e.g., in storage of other computing devices) and/or spanned across any number of computing devices without departing from embodiments disclosed herein. The data structures discussed in this Detailed Description may be implemented using, for example, files and file systems, lists, linked lists, tables, unstructured data, databases, etc.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing policy synchronizations, comprising:

identifying, by a storage manager, a policy retrieval synchronization generation event;

in response to the identifying:

identifying, by the storage manager, a maximum time interval and a minimum time interval stored in a storage;

generating a plurality of pseudo-random open time intervals using a synchronization algorithm, wherein the synchronization algorithm is a cryptographically secure pseudo-random number generator, a seed for the synchronization algorithm, a device start time, the maximum time interval, and the minimum time interval, wherein the seed and the device start time were generated during initialization prior to identifying the policy retrieval synchronization generation event, and wherein the seed and the device start time are transmitted to an air-gap device during the initialization such that the air-gap device independently computes matching pseudo-random open time intervals without further communication with the storage manager after the initialization, wherein the air-gap device maintains a default closed state for a network interface, and wherein the air-gap device opens the network interface between the storage manager and a control manager only during the plurality of pseudo-random open time intervals;

performing policy synchronizations using the plurality of pseudo-random open time intervals by obtaining a policy from a control manager, wherein the obtaining is performed by the storage manager sending a retrieval request through the network interface opened by the air-gap device;

making, based on performing the policy synchronization, a determination that a policy synchronization error has occurred, wherein determining that the policy synchronization error has occurred includes at least one of:

identifying one or more out of sync open time intervals within the plurality of pseudo-random open time intervals;

identifying an unexpected network communication during a closed time interval;

determining that the retrieval request was blocked;

determining that there are no more current open time intervals within the plurality of pseudo-random open time intervals;

determining that the policy has expired; and determining that there is an unexpected event associated with policy synchronization; and performing, in response to the determination, policy synchronization error remediation.

2. The method of claim 1, wherein the seed initializes the synchronization algorithm, wherein the synchronization algorithm comprises a Blum-Blum-Shub generator or other cryptographic generator configured to produce non-repeating, unpredictable time intervals.

3. The method of claim 1, wherein the maximum time interval specifies a maximum allowable time that an open interval of the open intervals lasts.

4. The method of claim 1, wherein the minimum time interval specifies a minimum allowable time that an open interval of the open interval lasts.

5. The method of claim 1, wherein the storage manager is operatively connected to the control manager through a network connection facilitated by an air gap device.

6. The method of claim 5, wherein the open time intervals specify periods of time from the device start time where the network connection is open.

7. The method of claim 5, wherein the air gap device generates the open time intervals using the synchronization algorithm, the seed, the device start time, the maximum time interval, and the minimum time interval.

8. The method of claim 5, wherein the network connection between the storage manager and the control manager is closed by the air gap device during the closed time interval.

9. The method of claim 5, wherein the network connection between the storage manager and the control manager is opened by the air gap device during an open time interval of the open time intervals.

10. The method of claim 5, wherein performing policy synchronizations using the open time intervals by obtaining a policy from a control manager comprises:

making a determination that an open time interval of the open time intervals is occurring;

in response to the determination:

sending a policy retrieval request to the air gap device to pull the policy from the control manager;

obtaining, in response to the policy retrieval request, the policy from the control manager through the air gap device;

updating a current policy with the policy; and initiating performance of storage management using the policy.

11. A non-transitory computer readable medium comprising computer readable program code, which when executed by a computer processor enables the computer processor to perform a method for performing policy synchronizations, the method comprising:

identifying by a storage manager, a policy retrieval synchronization generation event;

in response to the identifying, identifying, by the storage manager, a maximum time interval and a minimum time interval stored in a storage;

generating a plurality of pseudo-random open time intervals using a synchronization algorithm, wherein the synchronization algorithm is a cryptographically secure pseudo-random number generator, a seed for the synchronization algorithm, a device start time, the maximum time interval, and the minimum time interval, wherein the seed and the device start time were generated during initialization prior to identifying the policy retrieval synchronization generation event, and wherein the seed and the device start time are transmitted to an air-gap device during the initialization such that the air-gap device independently computes matching pseudo-random open time intervals without further communication with the storage manager after the initialization, wherein the air-gap device maintains a default closed state for a network interface, and wherein the air-gap device opens the network interface between the storage manager and a control manager only during the plurality of pseudo-random open time intervals; and performing policy synchronizations using the plurality of pseudo-random open time intervals by obtaining a policy from a control manager, wherein the obtaining is performed by the storage manager sending a retrieval request through the network interface opened by the air-gap device;

making, based on performing the policy synchronization, a determination that a policy synchronization error has occurred, wherein determining that the policy synchronization error has occurred includes at least one of:

identifying one or more out of sync open time intervals within the plurality of pseudo-random open time intervals;

identifying an unexpected network communication during a closed time interval;

determining that the retrieval request was blocked;

determining that there are no more current open time intervals within the plurality of pseudo-random open time intervals;

determining that the policy has expired; and determining that there is an unexpected event associated with policy synchronization; and performing, in response to the determination, policy synchronization error remediation.

12. The non-transitory computer readable medium of claim 11, wherein the seed initializes the synchronization algorithm, wherein the synchronization algorithm comprises a Blum-Blum-Shub generator or other cryptographic generator configured to produce non-repeating, unpredictable time intervals.

13. The non-transitory computer readable medium of claim 11, wherein the maximum time interval specifies a maximum allowable time that an open interval of the open intervals lasts.

14. The non-transitory computer readable medium of claim 11, wherein the minimum time interval specifies a minimum allowable time that an open interval of the open interval lasts.

15. The non-transitory computer readable medium of claim 11, wherein the storage manager is operatively connected to the control manager through a network connection facilitated by an air gap device.

16. The non-transitory computer readable medium of claim 15, wherein the open time intervals specify periods of time from the device start time where the network connection is open.

17. The non-transitory computer readable medium of claim 15, wherein the air gap device generates the open time intervals using the synchronization algorithm, the seed, the device start time, the maximum time interval, and the minimum time interval.

18. The non-transitory computer readable medium of claim 15, wherein the network connection between the storage manager and the control manager is closed by the air gap device during the closed time interval.

19. The non-transitory computer readable medium of claim 15, wherein the network connection between the storage manager and the control manager is opened by the air gap device during an open time interval.

20. The non-transitory computer readable medium of claim 15, wherein performing policy synchronizations using the open time intervals by obtaining a policy from a control manager comprises:

making a determination that an open time interval is occurring;

in response to the determination:

sending a policy retrieval request to the air gap device to pull policy from the control manager;

obtaining an updated policy from the control manager through the air gap device;

updating a current policy with the updated policy; and initiating performance of storage management using the updated policy.

* * * * *